United States Patent
Evans

(10) Patent No.: US 8,061,137 B2
(45) Date of Patent: Nov. 22, 2011

(54) FUEL CONTROL SYSTEM FOR LIMITING TURBOCHARGER SPEED

(75) Inventor: Raymond Geraint Evans, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 770 days.

(21) Appl. No.: 12/155,182

(22) Filed: May 30, 2008

(65) Prior Publication Data
US 2009/0293476 A1 Dec. 3, 2009

(51) Int. Cl.
F02D 23/00 (2006.01)
F02D 41/00 (2006.01)
F02D 31/00 (2006.01)
F02B 33/44 (2006.01)
G01F 19/00 (2006.01)

(52) U.S. Cl. .............. 60/603; 60/612; 60/602; 123/350; 123/352; 701/103

(58) Field of Classification Search ............ 60/600–603, 60/612; 701/102–104; 123/350, 352
See application file for complete search history.

(56) References Cited

U.S. PATENT DOCUMENTS

| | | | | |
|---|---|---|---|---|
| 3,878,400 A * | 4/1975 | McSparran | ............ | 290/14 |
| 4,061,025 A * | 12/1977 | Willenbecher et al. | .... | 73/114.25 |
| 4,100,793 A * | 7/1978 | Goetsch et al. | ............ | 73/114.72 |
| 4,334,427 A * | 6/1982 | Armstrong | ............ | 73/114.77 |
| 4,496,286 A | 1/1985 | Gagnon | ............ | 60/603 |
| 4,955,199 A * | 9/1990 | Kawamura | ............ | 60/612 |
| 4,958,497 A * | 9/1990 | Kawamura | ............ | 60/612 |
| 5,088,286 A * | 2/1992 | Muraji | ............ | 60/608 |
| 5,307,632 A | 5/1994 | Gottemoller et al. | ............ | 60/603 |
| 5,386,698 A | 2/1995 | Kamel | ............ | 60/603 |
| 6,196,189 B1 * | 3/2001 | Baldwin et al. | ............ | 123/352 |
| 6,345,602 B1 * | 2/2002 | Maddock et al. | ............ | 123/352 |
| 6,725,659 B1 | 4/2004 | Shao et al. | ............ | 60/601 |
| 6,725,660 B2 * | 4/2004 | Hidaka | ............ | 60/602 |
| 6,807,939 B1 * | 10/2004 | Doelker et al. | ............ | 123/350 |
| 6,889,502 B1 | 5/2005 | French et al. | ............ | 60/601 |
| 6,944,532 B2 * | 9/2005 | Bellinger | ............ | 123/350 |
| 7,047,938 B2 * | 5/2006 | Flynn et al. | ............ | 123/352 |
| 7,089,738 B1 | 8/2006 | Boewe et al. | ............ | 60/602 |
| 7,275,374 B2 | 10/2007 | Stewart et al. | ............ | 60/601 |
| 2004/0255583 A1 | 12/2004 | Otake | ............ | 60/601 |
| 2007/0219703 A1 | 9/2007 | Wagner et al. | ............ | 701/102 |
| 2007/0283695 A1 | 12/2007 | Figura | ............ | 60/601 |
| 2009/0031723 A1 * | 2/2009 | Gehrke et al. | ............ | 60/603 |
| 2009/0076709 A1 * | 3/2009 | Shiraishi et al. | ............ | 701/103 |

* cited by examiner

*Primary Examiner* — Thai Ba Trieu
(74) *Attorney, Agent, or Firm* — Finnegan, Henderson, Farabow, Garrett & Dunner LLP

(57) ABSTRACT

A method is provided for operating a turbocharger. The method includes sensing a parameter indicative of a speed of a turbocharger and a parameter indicative of an engine speed. The method also includes determining a first desired engine speed based on the speed of the turbocharger, the engine speed, and a maximum desired speed of the turbocharger. The method further includes regulating a flow of fuel to an engine based on the first desired engine speed.

17 Claims, 4 Drawing Sheets

US 8,061,137 B2

FUEL CONTROL SYSTEM FOR LIMITING TURBOCHARGER SPEED

TECHNICAL FIELD

The present disclosure is directed to a fuel control system and, more particularly, to a fuel control system for limiting the speed of a turbocharger.

BACKGROUND

Internal combustion engines such as, for example, diesel engines, gasoline engines, and gaseous fuel powered engines, combust a mixture of air and fuel to produce power. The amount of air and fuel, and the ratio of air-to-fuel introduced into a combustion chamber of the engine can affect power output, efficiency, and exhaust emissions of the engine. Typically, the amount of air introduced into the engine and the ratio of air-to-fuel are controlled by a number of different fluid handling components located in both the air induction and exhaust systems of the engine.

An engine often includes a turbocharger to increase a power density of the engine. A turbocharger includes a turbine, driven by exhaust of the engine, to rotate a compressor and pressurize air directed into the engine. As more exhaust is directed to the turbine, the turbine rotational speed increases, thereby causing the compressor rotational speed to increase, which raises the pressure of air being directed into the engine. However, if the speed of turbine rotation is above an overspeed limit, damage may occur to the components of the turbocharger.

One method that has been employed to prevent the speed of the turbocharger from exceeding the overspeed limit can be found in U.S. Pat. No. 6,725,659 (the '659 patent) issued to Shao et al. on Apr. 27, 2004. The '659 patent discloses a fueling control system that generates a fueling signal for an engine based on various fuel limits stored in a memory of the control system. Among the fuel limits included in the fueling control system is an air-to-fuel or oxygen-to-fuel control (AFC/OFC) table, which controls fueling based on an air-to-fuel ratio. Another fueling limit included in the fueling control system is a turbo speed limit for limiting the rotational speed of the turbocharger. Both the AFC/OFC limit and the turbo speed limit are set and activated in response to various parameters of the engine system. When the final fueling signal is generated by the fueling control system, the limits stored within the memory are compared to each other. The limit having the lowest value is used as an upper threshold for the fueling rate.

Although the system disclosed in the '659 patent may set an upper limit for the turbocharger speed, the efficiency of the turbocharger and any protection from overspeed damage may be limited. In particular, the '659 system relies on engine parameters such as, for example, boost pressure, engine acceleration, etc. to set the turbo speed limit and determine when to invoke such a limit. Such parameters may indicate an estimated turbocharger speed but do not measure the actual turbocharger speed. Any error between the estimated speed and the actual speed may have consequences regarding the performance of the turbocharger. For example, if the actual speed is less than the estimated speed, the turbine may not be permitted to reach its full power generation capacity, thereby reducing efficiency. In addition, if the actual speed is greater than the estimated speed, the turbocharger speed may exceed the overspeed threshold and possibly damage the turbocharger.

The disclosed system is directed to overcoming one or more of the problems set forth above.

SUMMARY

In one aspect of the present disclosure a method is provided for operating a turbocharger. The method includes sensing a parameter indicative of a speed of a turbocharger and a parameter indicative of an engine speed. The method also includes determining a first desired engine speed based on the speed of the turbocharger, the engine speed, and a maximum desired speed of the turbocharger. The method further includes regulating a flow of fuel to an engine based on the first desired engine speed.

Consistent with a further aspect of the disclosure, a method is provided for operating a plurality of turbochargers. The method includes sensing a parameter indicative of a speed of each turbocharger and sensing a parameter indicative of an engine speed. The method also includes determining a first desired engine speed based on the speeds of the plurality of turbochargers, the engine speed, and maximum desired speeds of each turbocharger. The method further includes regulating a flow of fuel to an engine based on the first desired engine speed.

Consistent with yet a further aspect, the disclosure is directed toward a power system including an engine and a fuel system situated to supply fuel to the engine. The power system also includes at least one turbocharger situated to supply charged air to the engine. In addition, the power system includes a controller configured to regulate the rate of fuel being supplied to the engine based on a first parameter indicative of a speed of the at least one turbocharger, a second parameter indicative of an engine speed, and a maximum desired speed of the at least one turbocharger.

DETAILED DESCRIPTION

Figure 1:
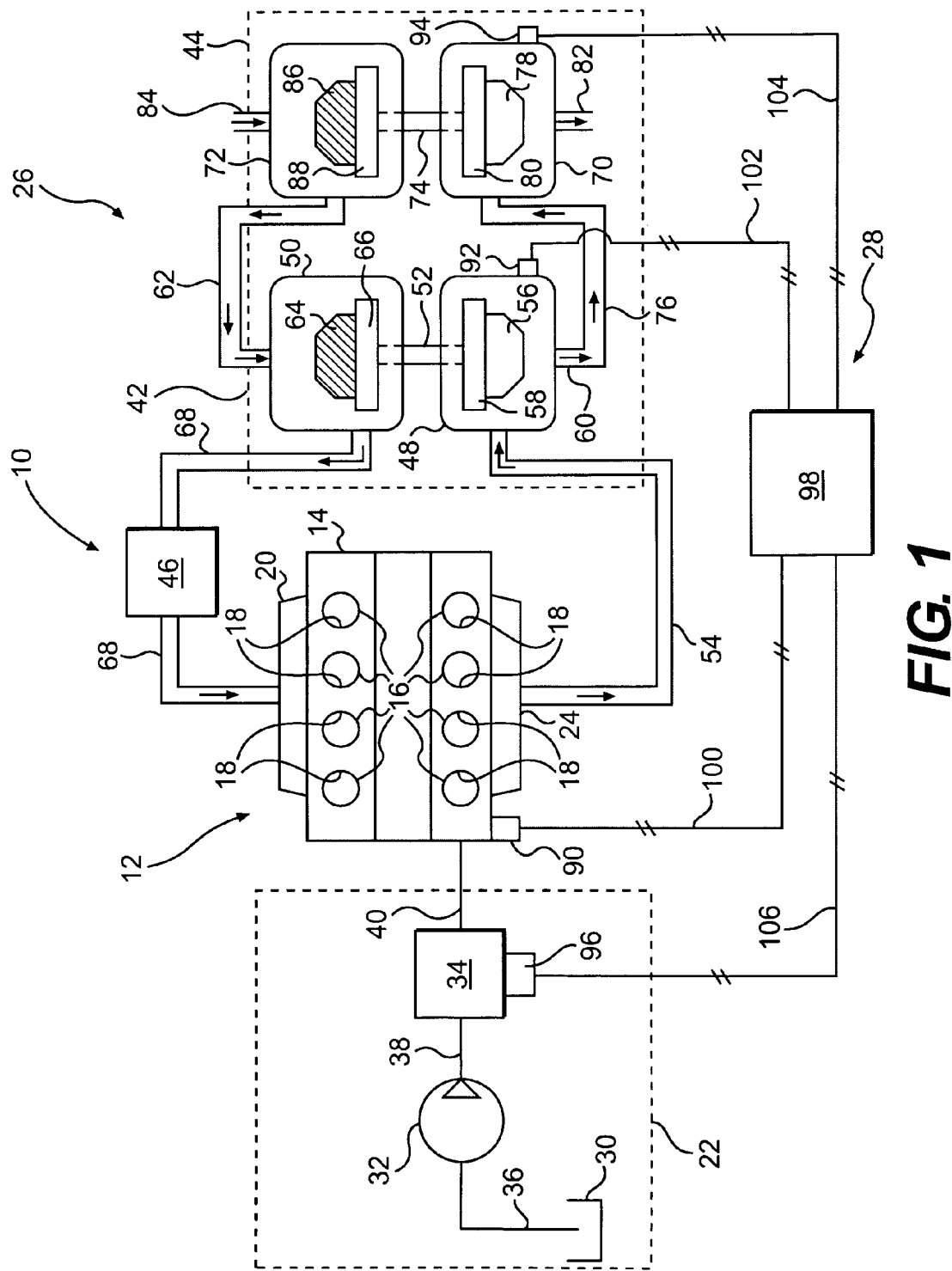
FIG. 1 is a schematic illustration of an exemplary disclosed power system.

FIG. 1 illustrates an exemplary disclosed power system 10 having multiple components that cooperate to produce a power output. Power system 10 may include an engine 12 having an engine block 14 that defines a plurality of cylinders 16, a piston (not shown) slidably disposed within each cylinder 16, and a cylinder head (not shown) associated with each cylinder 16. It is contemplated that engine 12 may include additional or different components such as, for example, a valve mechanism associated with each cylinder head, one or more fuel injectors, and other components known in the art. For the purposes of this disclosure, engine 12 is depicted and described as a diesel engine. One skilled in the art will recognize, however, that engine 12 may embody any other type of internal combustion engine such as, for example, a gasoline or a gaseous fuel-powered engine.

The piston, cylinder head, and cylinder 16 may form a combustion chamber 18 in which a mixture of fuel and air may be combusted. Each combustion chamber 18 may receive atmospheric or charged air from an air inlet manifold 20 and may receive fuel from a fuel system 22. In addition, exhaust gas generated by the combustion of the air/fuel mixture may exit each combustion chamber 18 to an exhaust manifold 24. In the illustrated embodiment, engine 12 includes eight combustion chambers 18. However, it is contemplated that engine 12 may include a greater or lesser number of combustion chambers 18 and that the combustion chambers 18 may be disposed in an "in-line" configuration, a "V" configuration, or any other suitable configuration.

As is also shown in FIG. 1, power system 10 may include a plurality of systems in addition to fuel system 22 that facilitate production of the power output. In particular, power system 10 may include an air induction system 26 and a control system 28. It is contemplated that engine 12 may include additional systems such as, for example, a lubrication system, a transmission system, a cooling system, an emissions control system, and other such engine systems that are known in the art.

Fuel system 22 may supply fuel to engine 12 and may include a fuel tank 30 for holding fuel, a fuel pump 32 for drawing fuel from fuel tank 30, and a fuel regulator 34 for regulating the amount of fuel permitted to enter engine 12. Fuel pump 32 may draw fuel from fuel tank 30 via a fuel line 36 and may be any type of pump capable of imparting fuel flow from fuel tank 30 through fuel system 22. For example, fuel pump 32 may be a fixed displacement/variable delivery pump, a variable displacement pump, or a fixed delivery pump. In addition, fuel pump 32 may be operably connected to and mechanically driven by engine 12. Alternatively, fuel pump 32 may be driven electronically, hydraulically, pneumatically, or in any other known manner.

Fuel regulator 34 may receive fuel from fuel pump 32 via a fuel line 38 and may direct fuel to engine 12 via a fuel line 40. In addition, fuel regulator 34 may control fuel flow into each combustion chamber 18 of engine 12. As shown in FIG. 1, fuel regulator 34 may embody a valve located outside engine block 14. Alternatively, fuel regulator 34 may embody a fuel injector system (not shown) including fuel injectors that may be disposed within engine block 14 to inject a regulated amount of pressurized fuel into each cylinder. It is contemplated that fuel regulator 34 may be operated hydraulically, mechanically, electrically, pneumatically, or in any other known manner.

Air induction system 26 may increase the power output of engine 12 by compressing air flowing into engine 12 and may include turbochargers 42 and 44 and an air cooler 46 inserted between turbocharger 42 and air inlet manifold 20 to cool the pressurized air before the air enters engine 12. It should be understood that, although air induction system 26 is illustrated having turbochargers 42 and 44, air induction system 26 may include a greater or lesser number of turbochargers. In addition, it is contemplated that air cooler 46 may be omitted, if desired.

Turbocharger 42 may include a turbine 48 mechanically connected on a shared axis to a compressor 50 via a shaft 52. In addition, turbocharger 42 may include a bearing housing including a bearing (not shown) for supporting shaft 52 and improving efficiency and reducing wear of turbocharger 42. It is contemplated that the bearing may be a rotary bearing and more specifically, a fluid bearing. Alternatively, the bearing may be any type of bearing sufficient to reduce wear of turbocharger 42.

Turbine 48 may be connected to exhaust manifold 24 by an exhaust line 54 and may include a plurality of turbine blades 56 mounted to a turbine wheel 58. In addition, turbine wheel 58 may be rotatably connected to shaft 52. As exhaust flows from exhaust manifold 24 into turbine 48, the exhaust may cause turbine blades 56 to spin shaft 52, thereby driving compressor 50. Furthermore, the amount of exhaust flow passing through turbine 48 may affect the speed of compressor 50. For example, an increase in exhaust flow and/or exhaust heat from engine 12 may cause turbine blades 56 to spin shaft 52 and drive compressor 50 at a higher rotational speed. Likewise, a reduction in exhaust flow and/or exhaust heat from engine 12 may cause turbine blades 56 to spin shaft 52 and drive compressor 50 at a slower rotational speed. After causing turbine blades 56 to turn shaft 52, the exhaust flow may exit turbine 48 via an exhaust exit port 60.

Compressor 50 may receive pre-charged air from turbocharger 44 via a charged air passage 62 and compress the received air to a predetermined pressure level. In addition, compressor 50 may include a plurality of compressor blades 64 mounted to a compressor wheel 66, which may be connected to shaft 52. Rotational force from turbine 48 may be transferred to compressor 50 via shaft 52, thereby spinning compressor blades 64 to further pressurize the pre-charged air. Therefore, rotation of compressor blades 64 within compressor 50 may pressurize the air entering engine 12. Once the air is pressurized to the desired level, it may be directed from compressor 50 to air inlet manifold 20 via an air inlet line 68. It should be understood that in embodiments where turbocharger 42 is the only turbocharger included in air induction system 26, charged air passage 62 may be replaced with an air inlet (not shown) exposed to atmospheric air. In such an embodiment, compressor 50 may receive atmospheric air via the air inlet and compress the received air to a predetermined pressure level.

Turbocharger 44 may include a turbine 70 mechanically connected on a shared axis to a compressor 72 via a shaft 74. Similar to turbocharger 42, turbocharger 44 may include a bearing housing including a bearing (not shown) for supporting shaft 74 and improving efficiency and reducing wear of turbocharger 44.

Turbine 70 may be connected to exhaust exit port 60 of turbocharger 42 by an exhaust line 76 and may include a plurality of turbine blades 78 mounted to a turbine wheel 80. In addition, turbine wheel 80 may be rotatably connected to shaft 74. As exhaust flows from turbocharger 44 into turbine 70, the exhaust may cause turbine blades 78 to spin shaft 74, thereby driving compressor 72. After causing turbine blades 78 to turn shaft 74, the exhaust flow may exit turbine 70 via an exhaust exit port 82.

Compressor 72 may receive atmospheric air via an inlet 84 and compress the received air to a predetermined pressure level. In addition, compressor 72 may include a plurality of compressor blades 86 mounted to a compressor wheel 88, which may be connected to shaft 74. Rotational force from turbine 70 may be transferred to compressor 72 via shaft 74, thereby spinning compressor blades 86 to pressurize the atmospheric air. Once the atmospheric air is pressurized, it may be directed from compressor 72 to compressor 50 via charged air passage 62. It is contemplated that in embodiments utilizing additional turbochargers, compressor 72 may receive charged air from compressors located upstream of compressor 72 via a charged air passage (not shown), which may replace inlet 84.

Control system 28 may regulate a speed of turbochargers 42 and 44 by controlling the operation of engine 12, fuel system 22, and air induction system 26. In addition, control system 28 may take any form such as, for example, a computer based system, a microprocessor based system, a microcontroller, or any other suitable control type circuit or system. Control system 28 may include various components for running software applications designed to regulate the speed of turbochargers 42 and 44. For example, control system 28 may include a central processing unit (CPU), a random access memory (RAM), input/output (I/O) elements, etc. In addition, control system 28 may include speed sensors 90, 92, 94, a flow sensor 96, and a controller 98.

Speed sensor 90 may be associated with engine 12 to sense an output speed thereof and may be in communication with controller 98 via a communication line 100. In one example, speed sensor 90 may embody a magnetic pickup type of sensor associated with a magnet embedded within a rotational component of engine 12 such as a crankshaft (not shown) or flywheel (not shown). During operation of engine 12, speed sensor 90 may sense the rotating magnetic field produced by the magnet and generate a signal corresponding to the rotational speed of engine 12.

Speed sensor 92 may be associated with turbine 48 to sense an output speed thereof and may be in communication with controller 98 via a communication line 102. In one example, speed sensor 92 may embody a magnetic pickup type of sensor associated with a magnet embedded within a rotational component of turbine 48 such as shaft 52. During operation of turbine 48, speed sensor 92 may sense the rotating magnetic field produced by the magnet and generate a signal corresponding to the rotational speed of turbine 48.

Speed sensor 94 may be associated with turbine 70 to sense an output speed thereof and may be in communication with controller 98 via a communication line 104. In one example, speed sensor 94 may embody a magnetic pickup type of sensor associated with a magnet embedded within a rotational component of turbine 70 such as shaft 74. During operation of turbine 70, speed sensor 94 may sense the rotating magnetic field produced by the magnet and generate a signal corresponding to the rotational speed of turbine 70. It is contemplated that in embodiments where turbocharger 42 is the only turbocharger included in air induction system 26, speed sensor 94 and communication line 104 may be omitted.

Flow sensor 96 may be associated with fuel system 22 to sense a flow rate of fuel being supplied to engine 12 and may be in communication with controller 98 via a communication line 106. In one embodiment, sensor 96 may be a fuel flow sensor located in or near fuel system 22 to monitor a flow rate of fuel being sprayed into combustion chambers 18. It is contemplated that flow sensor 96 may be any other type of sensor capable of sensing a parameter indicative of a rate of fuel entering engine 12.

Controller 98 may regulate the operation of engine 12, fuel system 22, and turbochargers 42, 44 in response to operator requests, environmental inputs, and signals received from sensors 90, 92, 94, and 96. The operator requests may include magnitude of propulsion, vehicular speed, output torque, or any other request that may affect the speeds of turbochargers 42, 44. Various maps, algorithms, charts, graphs, etc. may be stored in the memory of controller 98 for interpreting the input signals and determining a course of action for operating turbochargers 42, 44.

Controller 98 may embody a single microprocessor or multiple microprocessors for controlling the operation of turbochargers 42, 44 in response to various received signals. Numerous commercially available microprocessors can be configured to perform the functions of controller 98. It should be appreciated that controller 98 could readily embody a general machine microprocessor capable of controlling numerous machine functions. In addition, controller 98 may include a memory, a secondary storage device, a processor, and any other components for running an application. Various other circuits may be associated with controller 98 such as power supply circuitry, signal conditioning circuitry, solenoid driver circuitry, and other types of circuitry.

Figure 2:
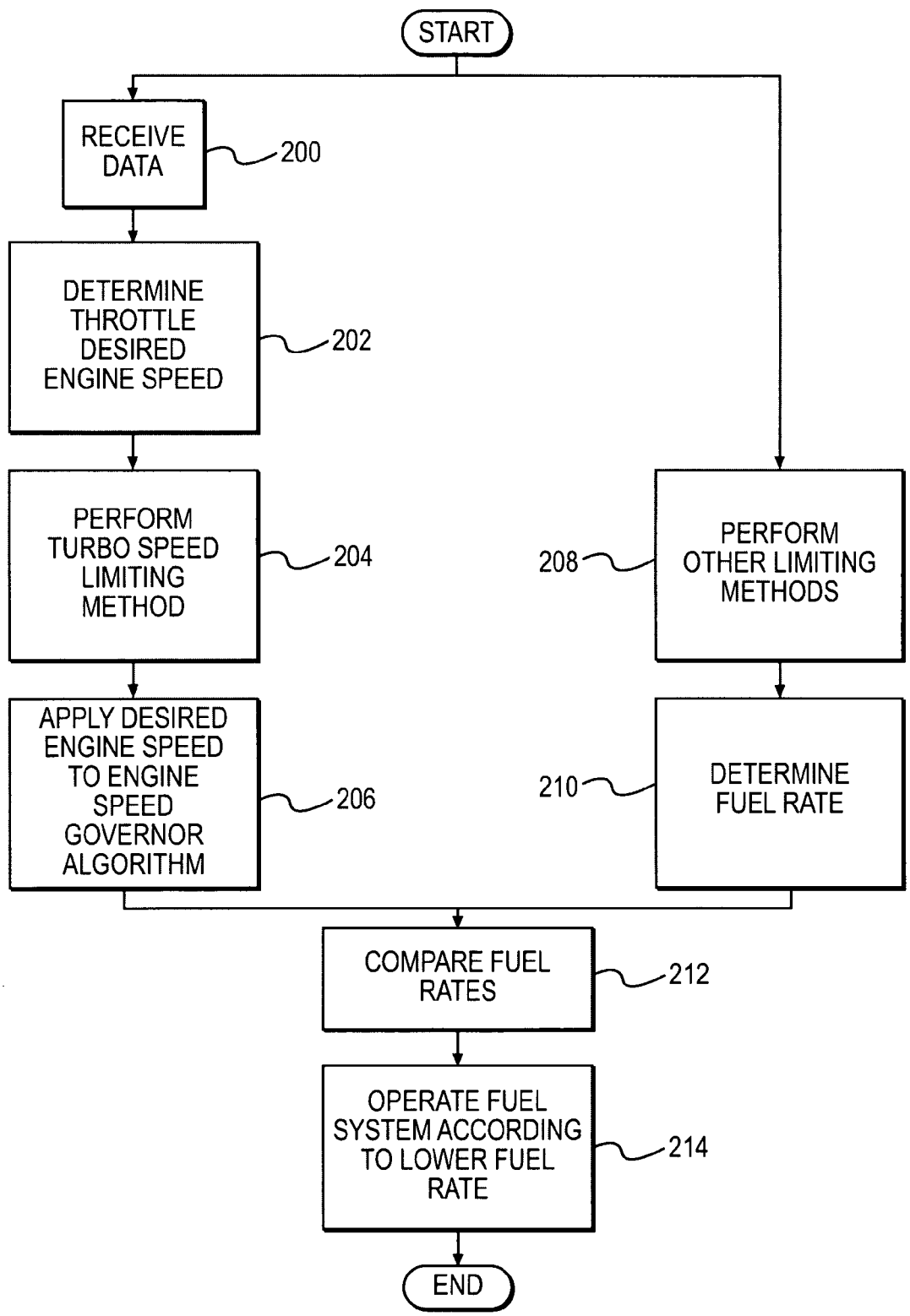
FIG. 2 is a flow chart showing an exemplary method for regulating a rate of fuel being supplied to an engine of the power system of FIG. 1.
Figure 3:
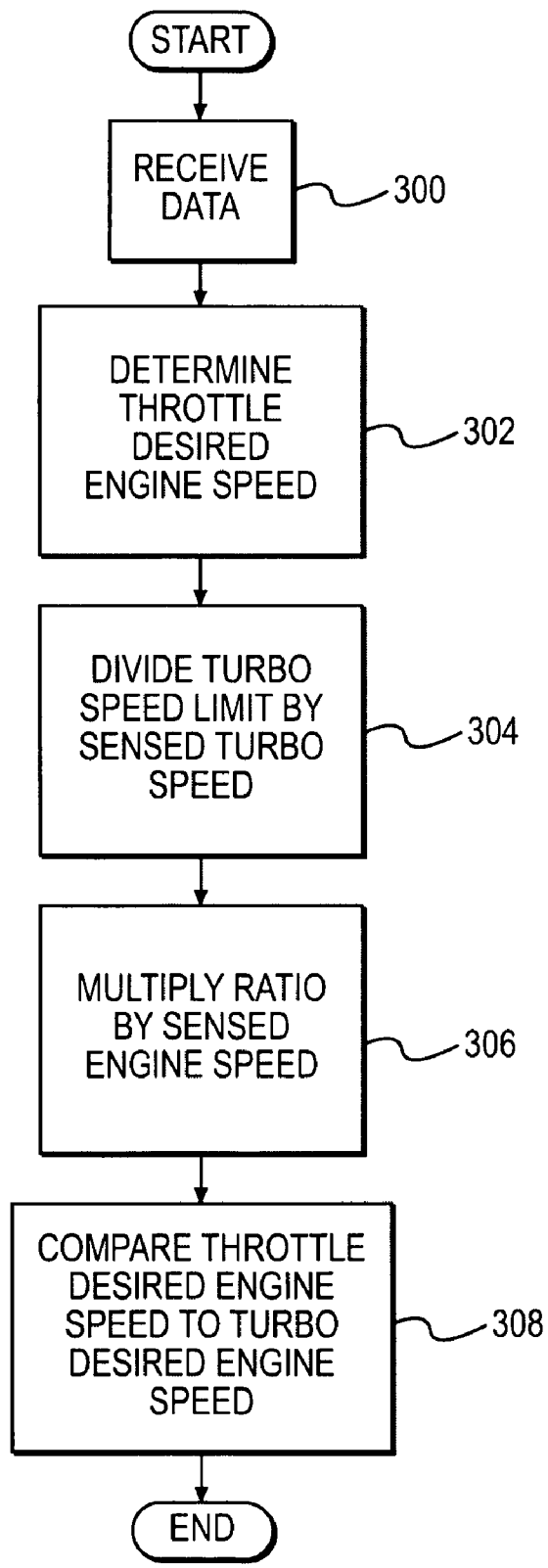
FIG. 3 is a flow chart showing an exemplary method for regulating a turbo speed that may be used in the fuel rate regulating method of FIG. 2.
Figure 4:
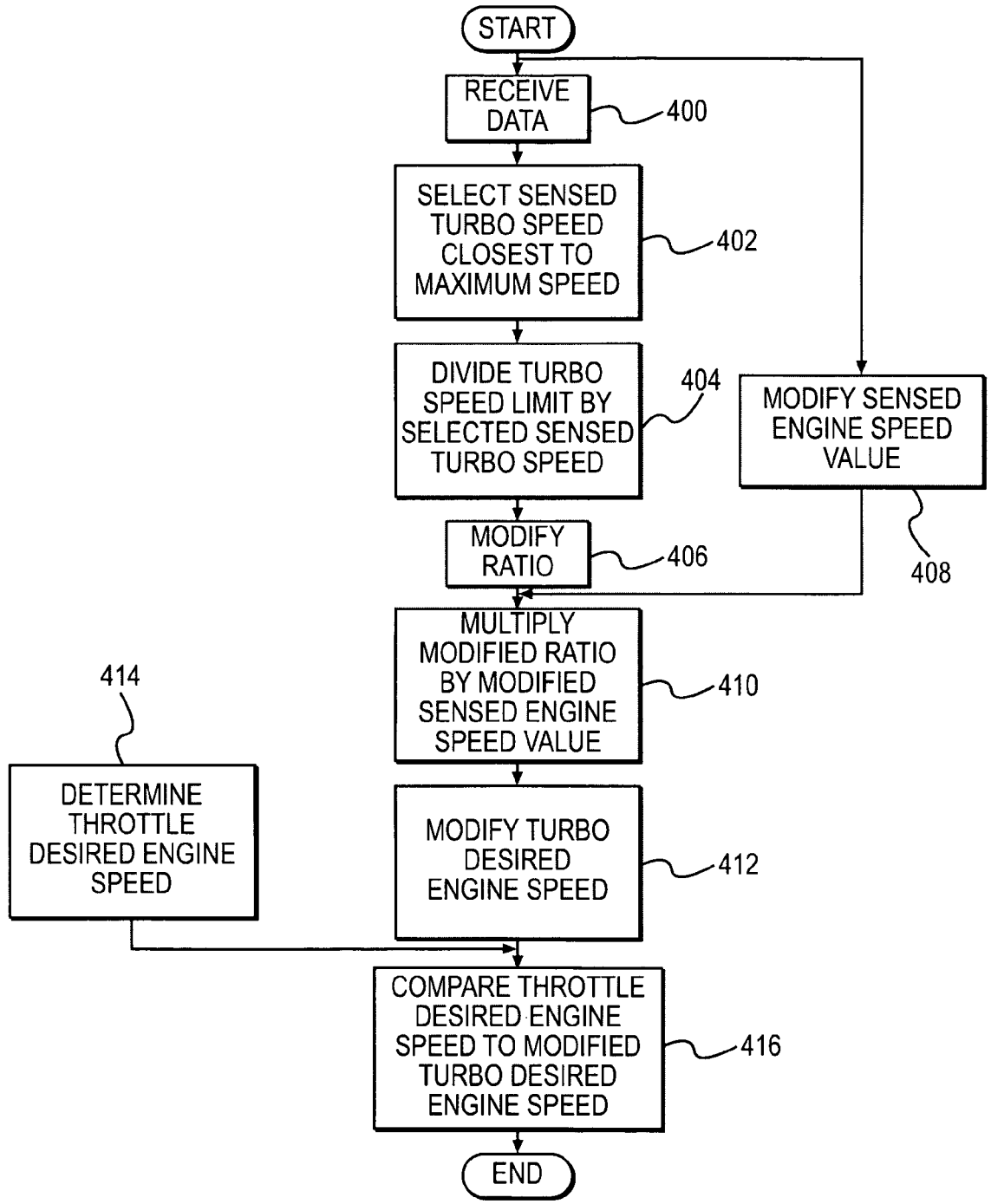
FIG. 4 is a flow chart showing another exemplary method for regulating a turbo speed that may be used in the fuel rate regulating method of FIG. 2.

FIGS. 2, 3, and 4, which are discussed in the following section, illustrate a method for regulating the speeds of turbochargers 42, 44 by controlling the fueling of engine 12. FIG. 2 illustrates a general fuel control method incorporating turbo speed limiting. In addition, FIGS. 3 and 4 illustrate a turbo speed regulation method.

INDUSTRIAL APPLICABILITY

The disclosed system may minimize the likelihood that the speed of one or more turbochargers of a power system may exceed an overspeed limit. In particular, the system may receive data indicative of current engine and turbocharger speeds and apply the data to a fuel control method. By regulating the fueling of the engine in response to the current turbocharger and engine speeds, the speed of the one or more turbochargers may be more closely regulated, thereby minimizing the likelihood that the turbo speed may exceed the overspeed limit. The operation of the fuel control method will now be explained.

FIG. 2 illustrates an exemplary method for determining a desired fueling rate for power system 10. The method may begin when controller 98 receives data indicative of a throttle signal, a turbocharger speed (turbo speed), and a speed of engine 12 (step 200). The throttle signal may be determined in response to a manipulation of an operator input device (not shown) or an output of a subsystem of power system 10 and may indicate a desired throttle setting for power system 10. In addition, data indicative of the turbo speed may be received from sensors 92 and/or 94. Furthermore, data indicative of the engine speed may be received from sensor 90.

After the data disclosed above has been received, the throttle signal may be used to generate a throttle desired engine speed (step 202). The throttle desired engine speed may be an engine speed corresponding to the throttle setting requested by the throttle signal. It is contemplated that, the throttle desired engine speed may be generated by comparing the throttle signal to various charts, maps, graphs, etc. stored in the memory of controller 98.

Once the throttle desired engine speed has been determined, a turbo speed limiting method may be performed to determine a desired engine speed (step 204). It is contemplated that the desired engine determined by the turbo speed limiting method may maximize horsepower generated by turbochargers 42, 44 while minimizing the likelihood of the turbo speed exceeding the maximum desired speed of turbine 48 and/or turbine 70. In addition, the turbo speed limiting method may incorporate the throttle desired engine speed, the received data, and a turbo speed limit. Such a turbo speed limit may be a maximum desired speed above which it may be undesirable to operate turbocharger 42 and/or turbocharger 44 such as, for example, an overspeed of turbine 48 and/or turbine 70. The desired engine speed determined by the turbo speed limiting method may be applied to an engine speed governor algorithm to determine a desired fuel rate (step 206). Such a desired fuel rate may maximize horsepower generated by turbocharger 42 and/or turbocharger 44 while minimizing the likelihood of the turbo speed exceeding the maximum desired speed of turbine 48 and /or turbine 70.

Other limiting methods may be performed independently of the turbo speed limiting method (step 208). Such methods may be performed to determine a fuel rate for a desired operation of various subsystems of power system 10. For example, the other limiting methods may include an emission limiting method, a power limiting method, etc. After performing the other limiting methods, controller 98 may select the lowest fuel rate determined by the other limiting methods (step 210). The selected fuel rate may be compared to the fuel rate determined by the engine speed governor (step 212), and fuel system 22 may be operated according to the lower of the two fuel rates (step 214).

FIG. 3 illustrates an exemplary embodiment of the turbo speed limiting method that may be used in the fuel rate regulation method disclosed above. It is contemplated that the method illustrated in FIG. 3 may be used when the only turbocharger included in air induction system 26 is turbocharger 42. Similar to the fuel rate determination method above, the turbo speed limiting method may begin when controller 98 receives data indicative of the throttle signal, the turbo speed of turbocharger 42, and the speed of engine 12 (step 300). In addition, similar to the fuel rate determination method above, the throttle signal may be used to determine the throttle desired engine speed (step 302). After the throttle desired engine speed is determined, the turbo speed limit may be divided by the sensed turbo speed to create a "turbo speed limit to sensed turbo speed" ratio (step 304). Once the ratio is determined, it may be multiplied by the sensed engine speed to determine a turbo desired engine speed (step 306). The turbo desired engine speed may be a desired engine speed based on the relationship between the current turbo speed and the turbo speed limit. The turbo desired engine speed may be compared to the throttle desired engine speed to determine which desired engine speed is lower (step 308). The lower of the two desired engine speeds may be applied to the engine speed governor algorithm as is disclosed in step 206 of FIG. 2.

Typically, if the ratio created in step 304 stays above 1.0 (i.e., the sensed turbo speed is less than the turbo speed limit), the throttle desired engine speed may be the desired engine speed applied to the engine speed governor algorithm, thereby maintaining normal operator throttle control. However, when there may be a large positive error between the throttle desired engine speed and the sensed engine speed (i.e., an acceleration event) and the turbo speed may be close to the turbo speed limit, the turbo desired engine speed may be the desired speed applied to the engine speed governor algorithm. Under these conditions, the ratio may be only slightly greater than 1.0, and the turbo desired engine speed resulting from the product of the ratio and the sensed turbo speed may be lower than the throttle desired engine speed. The net result may be that, following a transient event such as, for example, an engine speed acceleration, the method of FIG. 3 may dynamically move the desired engine speed applied to the engine speed governor algorithm toward the sensed engine speed. In other words, utilizing the ratio may drive the speed error of the engine speed governor algorithm toward zero as a function of the turbo speed error, thereby maximizing the power output of turbocharger 42 and/or turbocharger 44 while minimizing the likelihood that the turbo speed may exceed an upper desired turbo speed limit.

FIG. 4 illustrates another exemplary embodiment of the turbo speed limiting method that may be used in the fuel rate regulation method disclosed above. It is contemplated that the method illustrated in FIG. 4 may be used when the only turbocharger included in air induction system 26 is turbocharger 42, when air induction system includes both turbochargers 42 and 44, or when air induction system includes turbochargers 42 and 44 and additional turbochargers. Similar to the fuel rate determination method above, the turbo speed limiting method may begin when controller 98 receives data indicative of the throttle signal, the turbo speed of all turbochargers included in air induction system 26, and the speed of engine 12 (step 400).

After the data has been received, controller 98 may select the sensed turbo speed that is closest to a maximum desired speed (step 402). For embodiments where the only turbocharger included in air induction system 26 is turbocharger 42, the selected turbo speed may be the speed sensed by speed sensor 92. For embodiments where air induction system 26 includes multiple turbochargers, the selected turbo speed may be the turbo speed of the turbocharger with a turbine rotating closest to its maximum desired speed. For example, if the turbo speed of turbocharger 42 is approximately 50,000 rpm, and the maximum desired speed (e.g., overspeed limit) for turbine 48 is approximately 60,0000 rpm, turbocharger 42 may be operating at 83.3% of its maximum desired speed. In addition, if the turbo speed of turbocharger 44 is approximately 55,000 rpm, and the maximum desired speed (e.g., overspeed limit) for turbine 70 is approximately 79,0000 rpm, turbocharger 44 may be operating at 69.6% of its maximum desired speed. Therefore, because the current turbo speed of turbocharger 42 is closer to its maximum desired speed than the turbo speed of turbocharger 44 (i.e., 69.6% vs. 83.3%), controller 98 may select the turbo speed of turbocharger 42. This may ensure that no turbo speed exceeds the maximum desired speed of an associated turbocharger even when air induction system 26 utilizes multiple turbochargers having different maximum desired speeds. Furthermore, the above method may minimize any sacrifice of available engine horsepower. It is contemplated that a fixed reference of 1% of the lowest maximum desired speed of the turbochargers may be selected if none of the sensed turbo speeds exceeds the 1% value.

After selecting a sensed turbo speed, the maximum desired speed for the associated turbocharger may be divided by the sensed turbo speed to create a "turbo speed limit to sensed turbo speed" ratio similar to the ratio generated in step 304 of the method illustrated in FIG. 3 (step 404). The turbo speed limit may be the maximum desired speed of the turbocharger associated with the selected sensed turbo speed. Utilizing the ratio in its raw form to determine a turbo speed desired engine speed may minimize the likelihood of the turbo speed exceeding a maximum desired speed without compromising power generated by engine 12. However, during large magnitude transient events, modifying the ratio may improve the response of controller 98 to the changing conditions of power system 10. Therefore, it may be desired to modify the ratio (step 406). Such modifications may include, for example, applying lead and lag terms to the ratio. When applying lead and lag terms, the method may take on the characteristics of a proportional-integral-derivative (PID) controller, wherein the ratio may be the proportional component, the lead term may be the integral component, and the lag term may be the derivative component.

Before implementing the lead and lag terms, a gain factor may be applied to the ratio as a tuning parameter. In addition, it may be desired to apply a maximum limit and a minimum limit to the ratio to restrict the dynamic range of the ratio around its steady state signal of 1.0. In addition, the maximum and minimum limits may prevent the lead and lag terms from impeding acceleration. Furthermore, the maximum and minimum limits may cause the lead and lag terms to be active only when the selected sensed turbo speed may be close to the turbo speed limit, which may be when the lead and lag terms may be needed.

Similar to an integral term of a PID controller, the lead term may respond to accumulated errors between the turbo speed limit and the selected sensed turbo speed. In addition, similar to a derivative term of a PID controller, the lag term may respond to the rate of change of errors between the turbo speed limit and the selected sensed turbo speed. When used together, they may provide an overdamped performance characteristic that may prevent the speed of turbocharger 42 and/or turbocharger 44 from overshooting the turbo speed limit.

There may be a risk that the lead term may be too aggressive when the ratio moves away from the maximum limit. This may cause an excessive initial reduction in engine speed following a transient event involving an acceleration and an increasing load on engine 12. To prevent such an occurrence, the lead term may be set as a function of the ratio. For example, when the ratio is between the minimum limit and approximately 1.0, the time constant of the lead term may be approximately 100% of its nominal value. As the ratio increases from approximately 1.0 to the maximum limit, the lead term time constant may linearly decrease so that when the ratio is substantially equal to the maximum limit, the lead term time constant may be substantially equal to the time constant of the lag term.

Before multiplying the modified ratio by the sensed engine speed, it may be desired to apply another lag term to the sensed engine speed (step 408). When the engine speed is accelerating, the lag term may reduce the turbo desired engine speed, thereby amplifying the effect of the turbo speed limiting method. In particular, as the rate of the engine acceleration increases, the influence of the turbo speed limiting method over the fuel rate regulating method of FIG. 2 may also increase. Put another way, adding a lag term to the sensed engine speed may be equivalent to adding a derivative term to the engine speed governor algorithm's speed feedback, thereby adding an additional damping factor to the engine speed governor algorithm. After modifying the sensed engine speed, the modified ratio may be multiplied by the modified sensed engine speed value to determine a turbo desired engine speed (step 410).

One possible negative effect that may be caused by the lead and lag terms applied to the ratio and sensed engine speed may be the generation of unwanted noise. Such noise may adversely affect the various algorithms that may be performed by the in the fuel rate regulation method illustrated in FIG. 2. Therefore, it may be desired to modify the turbo desired engine speed by adding a lag term to attenuate the generated noise (step 412).

Similar to the fuel rate regulation method disclosed above, the throttle signal may be used to determine the throttle desired engine speed (step 414). After the throttle desired engine speed has been determined and the turbo desired engine speed has been modified, they may be compared to each other to determine which desired engine speed is lower (step 416). The lower of the two desired engine speeds may be applied to the engine speed governor algorithm as is disclosed in step 206 of FIG. 2.

Because the disclosed method may utilize measurements of the actual turbocharger speed and the actual engine speed, the performance of the turbocharger may be improved. In particular, the likelihood of turbo overspeed may be minimized, thereby minimizing the possibility of the turbocharger being damaged from overspeed conditions. In addition, the power generation of the turbocharger may be maximized, thereby increasing efficiency.

It will be apparent to those skilled in the art that various modifications and variations can be made in the disclosed system without departing from the scope of the disclosure.

Other embodiments will be apparent to those skilled in the art from consideration of the specification disclosed herein. It is intended that the specification and examples be considered as exemplary only, with a true scope being indicated by the following claims and their equivalents.

What is claimed is:

1. A method for operating a turbocharger, comprising:
    sensing with a first sensor a parameter indicative of a speed of the turbocharger;
    sensing with a second sensor a parameter indicative of an engine speed;
    determining with a controller a first desired engine speed, the first desired engine speed being based on the speed of the turbocharger, the engine speed multiplied by a ratio, and a maximum desired speed of the turbocharger stored in the controller, the ratio being a relation between the maximum desired speed of the turbocharger and the speed of the turbocharger; and
    regulating a flow of fuel to an engine based on the first desired engine speed.

2. The method of claim 1, wherein regulating the flow of fuel to the engine further includes comparing the first desired engine speed to a second desired engine speed and regulating the flow of fuel to the engine based on the desired engine speed having a lower value, the second desired engine speed being based on a desired throttle setting of the engine.

3. The method of claim 2, further including modifying the ratio before determining the first desired engine speed so that when the regulation of the flow of fuel to the engine is based on the first desired engine speed, the speed of the turbocharger is overdamped.

4. The method of claim 3, further including modifying the engine speed to increase the likelihood that the regulation of the flow of fuel to the engine is based on the first desired engine speed when the engine speed is accelerating.

5. The method of claim 4, further including determining a first desired engine fuel rate based on the first and second desired engine speeds.

6. The method of claim 5, wherein regulating the flow of fuel to the engine further includes comparing the first desired engine fuel rate and a second desired engine fuel rate and regulating the flow of fuel to the engine based on the fueling rate having a lower value.

7. The method of claim 1, wherein the maximum desired speed of the turbocharger is set to be an overspeed limit of the turbocharger.

8. A method for operating a plurality of turbochargers, comprising:
    sensing with turbocharger speed sensors a parameter indicative of a speed of each turbocharger;
    sensing with an engine speed sensor a parameter indicative of an engine speed;
    determining with a controller a first desired engine speed, the first desired engine speed being based on a speed of one of the plurality of turbochargers, the engine speed, and maximum desired speeds of each turbocharger stored in the controller, the turbocharger speed being a speed of the turbocharger operating closest to its maximum desired speed; and
    regulating a flow of fuel to an engine based on the first desired engine speed.

9. The method of claim 8, wherein determining the first desired engine speed further includes multiplying the engine speed by a ratio, the ratio being a relation between the maximum desired speed of the turbocharger associated with the selected turbocharger speed and the selected turbocharger speed.

10. The method of claim 9, wherein regulating the flow of fuel to the engine further includes comparing the first desired engine speed to a second desired engine speed and regulating the flow of fuel to the engine based on the desired engine speed having a lower value, the second desired engine speed being based on a desired throttle setting of the engine.

11. The method of claim 10, further including modifying the ratio before determining the first desired engine speed so that when the regulation of the flow of fuel to the engine is based on the first desired engine speed, the speed of the turbocharger is overdamped.

12. The method of claim 11, further including modifying the engine speed to increase the likelihood that the regulation of the flow of fuel to the engine is based on the first desired engine speed when the engine speed is accelerating.

13. The method of claim 12, further including determining a first desired engine fuel rate based on the first and second desired engine speeds.

14. The method of claim 13, wherein regulating the flow of fuel to the engine further includes comparing the first desired engine fuel rate and a second desired engine fuel rate and regulating the flow of fuel to the engine based on the fueling rate having a lower value.

15. The method of claim 8, wherein the maximum desired speed of each turbocharger is set to be an overspeed limit of the turbocharger.

16. A power system, comprising:
an engine;
a fuel system situated to supply fuel to the engine;
at least one turbocharger situated to supply charged air to the engine; and
a controller configured to regulate the rate of fuel being supplied to the engine, the regulation of the rate of fuel being supplied being based on a first parameter indicative of a speed of the at least one turbocharger sensed by a first sensor, a second parameter indicative of an engine speed sensed by a second sensor, and a maximum desired speed of the at least one turbocharger stored in the controller, the maximum desired speed of the at least one turbocharger being set to be an overspeed limit of the at least one turbocharger.

17. The power system of claim 16, wherein the controller is configured to regulate the rate of fuel being supplied to the engine based on a comparison between a first desired engine speed determined from a desired position of a throttle of the engine and a second desired engine speed based on the speed of the at least one turbocharger, the engine speed, and the maximum desired speed of the at least one turbocharger.

* * * * *